United States Patent Office.

GEORGE L. FEARIS, OF CONNERSVILLE, INDIANA.

Letters Patent No. 104,721, dated June 28, 1870.

IMPROVEMENT IN LINIMENT FOR TREATING NEURALGIA, &c.

The Schedule referred to in these Letters Patent and making part of the same.

*To all whom it may concern:*

Be it known that I, GEORGE L. FEARIS, of Connersville, in the county of Fayette and State of Indiana, have invented a new and useful Medical Compound or Liniment, which I call "Fearis' Japanese Liniment;" and I do hereby declare that the following is a full, clear, and exact description thereof, sufficient to enable those skilled in the art to which my invention appertains to make and use the same.

I take of vinegar, eggs, and turpentine, each, equal parts, and mix them well together. To three quarts of this mixture, I add two ounces of saltpeter, and eight ounces of rye whiskey, the saltpeter being dissolved in the whiskey before adding them to the first mixture. The whole of the ingredients is well mixed together, forming a liniment, to be used for sciatic and inflammatory rheumatism, neuralgia, sprains, swellings, and similar diseases. It is applied externally, by rubbing downward.

What I claim as new, and desire to secure by Letters Patent, is—

A liniment, composed of the ingredients and compounded in about the proportions herein specified.

GEORGE L. FEARIS.

Witnesses:
 ALONZO BRADFORD,
 CHARLES ROEHL.